(12) United States Patent
McCaffrey et al.

(10) Patent No.: US 6,438,958 B1
(45) Date of Patent: Aug. 27, 2002

(54) APPARATUS FOR REDUCING HEAT LOAD IN COMBUSTOR PANELS

(75) Inventors: Timothy P. McCaffrey, Swampscott; Frank A. Lastrina, Andover; Joseph D. Monty, Boxford; David E. Hrencecin, Peabody, all of MA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/513,943

(22) Filed: Feb. 28, 2000

(51) Int. Cl.⁷ .............................................. F23R 3/00
(52) U.S. Cl. ........................................ 60/752; 60/756
(58) Field of Search ........................ 60/752, 753, 755, 60/756, 757

(56) References Cited

U.S. PATENT DOCUMENTS

| | | | |
|---|---|---|---|
| 4,259,842 A | | 4/1981 | Koshoffer et al. |
| 4,628,694 A | * | 12/1986 | Kelm et al. ................... 60/752 |
| 4,655,044 A | | 4/1987 | Dierberger et al. |
| 5,113,660 A | * | 5/1992 | Able et al. .................... 60/752 |
| 5,331,816 A | * | 7/1994 | Able et al. .................... 60/752 |
| 5,553,455 A | * | 9/1996 | Craig et al. ................... 60/753 |
| 5,851,679 A | * | 12/1998 | Stowell et al. ................ 60/752 |
| 6,047,539 A | * | 4/2000 | Farmer ........................ 60/753 |

FOREIGN PATENT DOCUMENTS

| | | |
|---|---|---|
| EP | 0 136 071 | 4/1985 |
| EP | 0 493 304 | 7/1992 |
| JP | 59004824 | 1/1984 |

OTHER PUBLICATIONS

"Physics Part I", by Halliday and Resnick, John Wiley & Sons, Inc., 1966, p. 552.*

* cited by examiner

*Primary Examiner*—Michael Koczo
(74) *Attorney, Agent, or Firm*—Rodney M. Young; Armstrong Teasdale LLP

(57) ABSTRACT

A combustor liner has a stepped combustor liner surface defining a combustion zone and an overhang portion forming an air cooling slot. A layer of thermal barrier material is applied to the combustor liner such that at least one portion of the combustor liner receives a layer of thermal barrier material with a thickness greater than 0.01 inches. Thus, the combustor liner absorbs less heat, and the combustor may operate at higher temperatures. As a result, low cycle fatigue and thermal creep are reduced within the combustor and the life cycle for the combustor is extended.

12 Claims, 3 Drawing Sheets

US 6,438,958 B1

APPARATUS FOR REDUCING HEAT LOAD IN COMBUSTOR PANELS

BACKGROUND OF THE INVENTION

This invention relates generally to turbine engines, and, more particularly, to slot cooled ring combustors for turbine engines.

A turbine engine includes a compressor for compressing air which is mixed with a fuel and channeled to a combustor wherein the mixture is ignited for generating hot combustion gases. The combustion gases are channeled to a turbine, which extracts energy from the combustion gases for powering the compressor, as well as producing useful work to propel an aircraft in flight or to power a load, such as an electrical generator. Increased efficiency in gas turbine engines is accomplished at least in part by an increase in the operating temperature of the combustor. A limitation on the operating combustor temperature is a temperature limitation of combustor liner material.

Thin film convection cooling can be used to cool a combustor liner. With such cooling, a protective film boundary of cool air flows along an inner surface of the liner. The cool air flowing along the combustor liner inner surface forms a is protective boundary between the liner and the hot gases, and insulates the liner from hot combustion gases. See, for example, U.S. Pat. No. 4,259,842. Even with such cooling, however, the liner materials absorb heat. Over time, thermal creep and low cycle fatigue increase in the liner.

A thermal barrier coating also can be applied to inner surfaces of the combustor liner for providing thermal insulation against combustion gases. Thermal barrier coatings reduce an amount of cooling air required for a given combustion gas temperature, or allow an increase in a combustion gas temperature for increasing efficiency of the engine. See, for example, U.S. Pat. No. 5,960,632. Typically the thermal barrier coating is applied uniformly across the combustor liner with a thickness of 0.01 inches or less. Such a uniform thickness prevents the thermal barrier coating from undesirably building-up to potentially obstruct the flow of cooling air. However, the combustor liner materials still absorb heat, and thus, combustor assemblies are still subjected to thermal strains including creep and low cycle fatigue.

BRIEF SUMMARY OF THE INVENTION

In an exemplary embodiment, a combustor includes a combustor liner s with a thermal barrier material that has a thickness selected to minimize heat absorption. In the exemplary embodiment, the combustor includes a combustion zone formed by annular outer and inner supporting members and respective inner and outer liners. The inner and outer liners each include a series of panels and a plurality of cooling slots. The panels are arranged in steps relative to one another and form a stepped combustor liner surface. The plurality of cooling slots are formed by overhanging portions of the inner and outer liner panels. At least one portion of the combustor liner has a thermal barrier material with a thickness greater than 0.01 inches. In the exemplary embodiment, at least the outer and inner liner panels adjacent an inlet of the combustor have a thermal barrier material with a thickness greater than 0.01 inches.

As a result of the additional thickness of thermal barrier material applied to at least a portion of the combustor liner, the combustor liner material absorbs less heat, and therefore, at present day operating temperatures, the combustor may be operated at higher temperatures. Because the operating temperature is reduced, low cycle fatigue within the combustor is also reduced which, in turn, extends an operating life cycle of the combustor assembly.

DETAILED DESCRIPTION OF THE INVENTION

Figure 1:
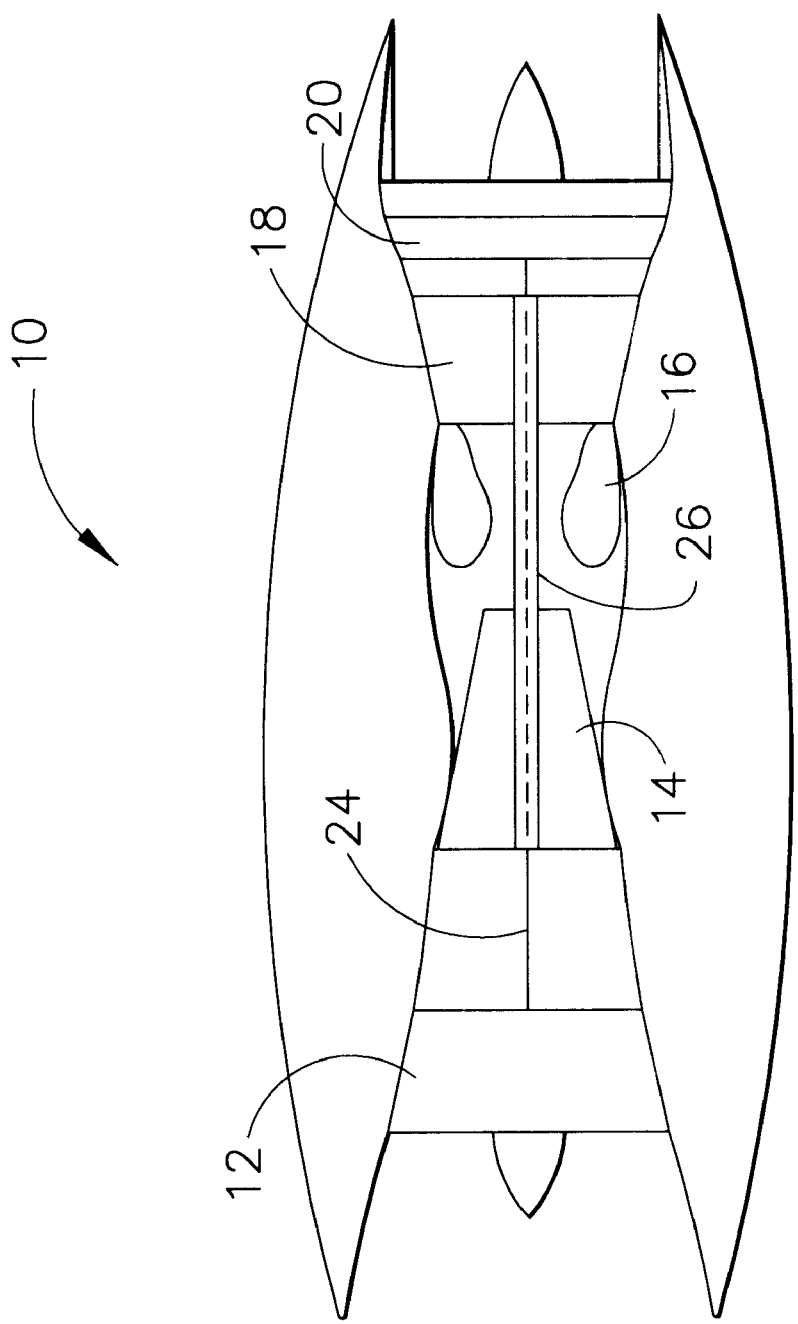
FIG. 1 is a schematic illustration of a gas turbine engine.

FIG. 1 is a schematic illustration of a gas turbine engine 10 including a low pressure compressor 12, a high pressure compressor 14, and a combustor assembly 16. Engine 10 also includes a high pressure turbine 18, and a low pressure turbine 20. Compressor 12 and turbine 20 are coupled by a first shaft 24, and compressor 14 and turbine 18 are coupled by a second shaft 26. In one embodiment, engine 10 is a CF34-3A/-3B engine available from General Electric Aircraft Engines, Cincinnati, Ohio.

In operation, air flows through low pressure compressor 12 from an inlet side 28 of engine 10 and compressed air is supplied from low pressure compressor 12 to high pressure compressor 14. Compressed air is then delivered to combustor assembly 16 where it is mixed with fuel an ignited. The combustion gases are channeled from combustor 16 to drive turbines 18 and 20.

Figure 2:
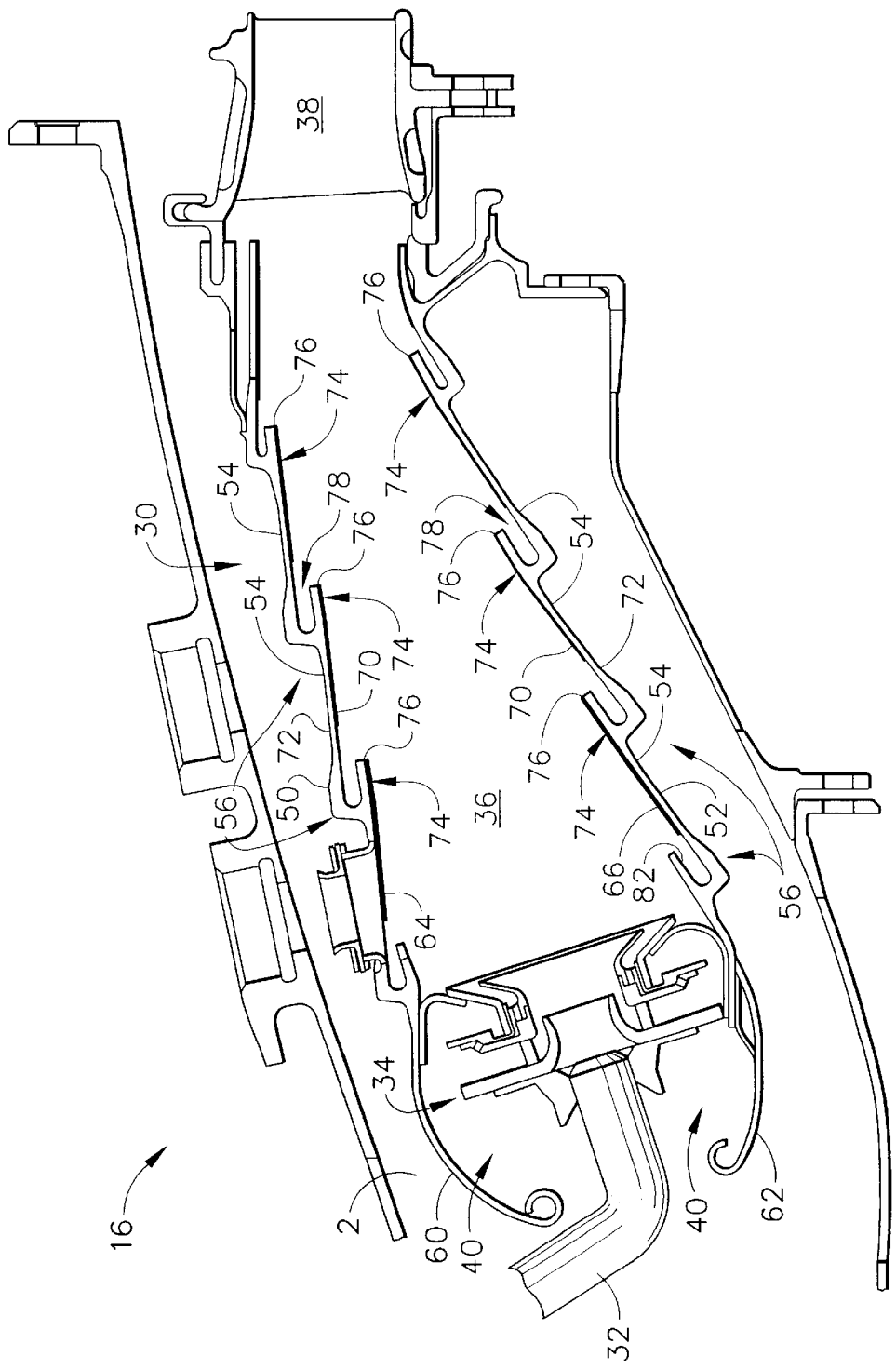
FIG. 2 is partial cross-sectional view of a combustor assembly used with the gas turbine engine shown in FIG. 1.
Figure 3:
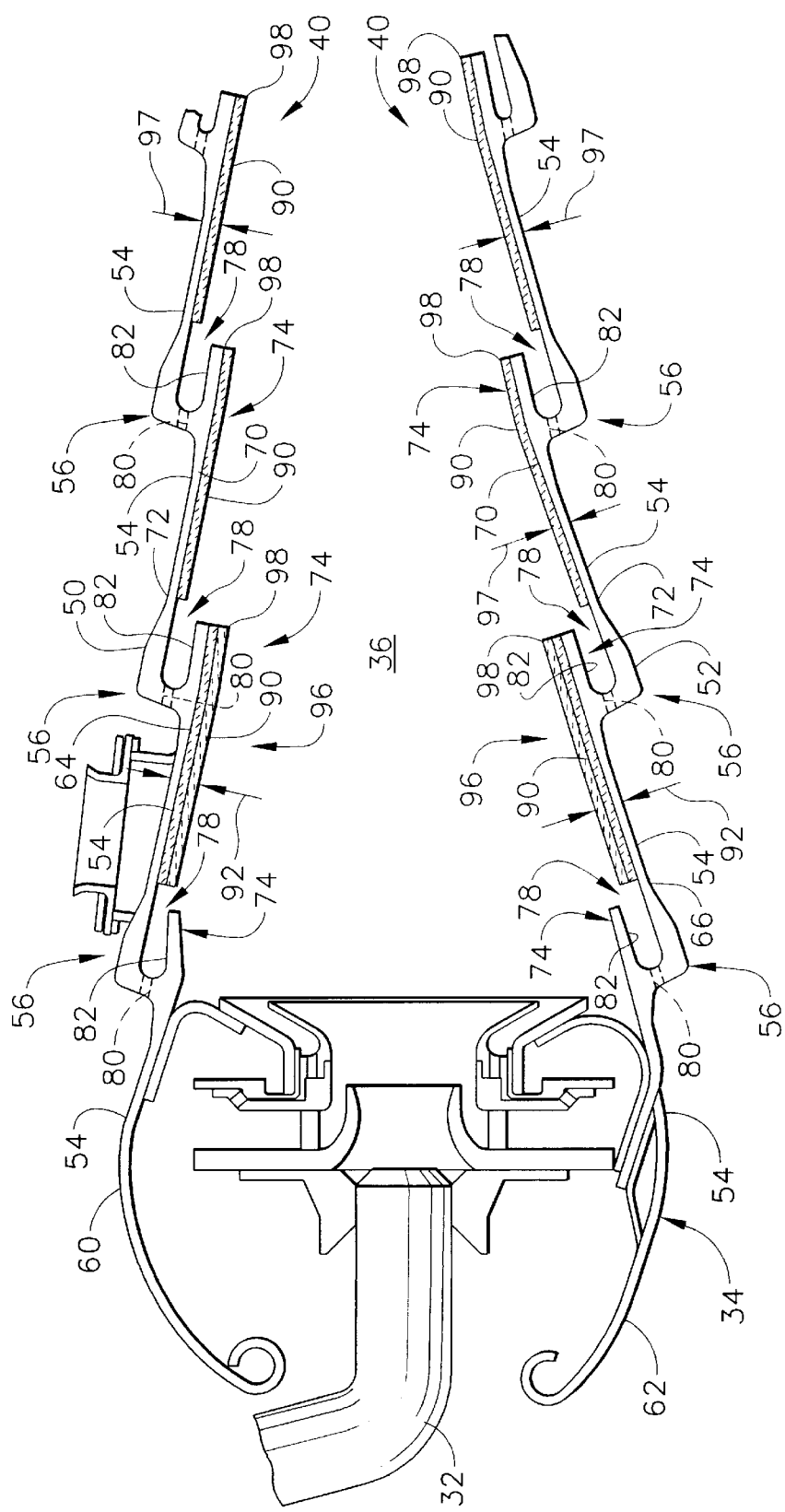
FIG. 3 is an enlarged view of a portion of the combustor assembly shown in FIG. 2 taken along area 2.

FIG. 2 is a partial cross-sectional view of combustor assembly 16 including a combustor 30 and a fuel injector 32. FIG. 3 is an enlarged view of a portion of combustor assembly 16. Fuel injector 32 is attached to an inlet 34 of combustor assembly 16 and injects atomized fuel into a combustion zone 36 of combustor 30 to form an air-fuel mixture. An igniter or cross-fire tube (not shown) ignites the air-fuel mixture downstream of fuel injector 32, and combustion gases exit combustor assembly 16 through an outlet turbine nozzle 38 that directs high energy combustion gases towards a row of turbine blades or buckets (not shown). The combustion gases rotate a turbine wheel (not shown) that delivers rotational energy to a compressor (not shown), powers a load, and/or is converted into thrust.

Combustion zone 36 is formed by annular, radially outer and radially inner supporting members (not shown) and a combustor liner 40. Combustor liner 40 shields the outer and inner supporting members from the heat generated within combustion zone 36 and includes an outer liner 50 and an inner liner 52. Outer liner 50 and inner liner 52 are annular and connect together to define combustion zone 36. Combustion zone 36 extends from combustor inlet 34 to outlet turbine nozzle 38. Outer and inner liners 50 and 52 each include a plurality of panels 54 which include a series of steps 56, each of which form a distinct portion of combustor liner 40.

Panels 54 are connected serially. Outer liner 50 and inner liner 52 each include a cowl 60 and 62, respectively, and a first panel 64 and 66, respectively. Inner cowl 60 and outer cowl 62 are positioned adjacent combustor inlet 34 and extend from combustor inlet 34 to first panels 64 and 66, respectively. First panels 64 and 66 are connected serially downstream from cowls 60 and 62, respectively, and each are connected between cowls 60 and 62, respectively, and additional outer and inner liner panels 54. In one embodiment, outer liner 50 and inner liner 52 each include nine panels 54.

Each combustor panel 54 includes a combustor liner surface 70, an exterior surface 72, and an overhang portion 74. Combustor liner surface 70, extends from combustor inlet 34 to outlet turbine nozzle 38. Combustor liner surface 70 and exterior surface 72 are connected together at overhang portion 74 and form a rear facing edge 76. A plurality of air cooling slots 78 separate adjacent combustor panels 54.

Air cooling slots 78 include openings 80 to receive air from an air plenum (not shown) and form a thin protective boundary of air between high temperature combustion gases and combustor liner surface 70, as well as providing for convective cooling of combustor liner 40. Air flows from openings 80 through slots 78 formed between combustor liner surface 70 and a bottom surface 82 of combustor liner overhang portions 74.

A layer 90 of thermal barrier material is applied on combustor liner surface 70 and extends from overhang portion 74 to overhang portion 74 of each step 54. Thermal barrier material further insulates combustor liner surface 70 from high temperature combustion gases. In an exemplary embodiment, thermal barrier material is commercially available from Englehart Industries, Wilmington Mass. Thermal barrier material is applied to combustor liner surface 70 over each combustor panel 54 disposed between combustor inlet 34 and combustor outlet turbine nozzle 38. Thermal barrier material is applied such that layer 90 has a thickness $T_1$ greater than 0.01 inches extending over at least a portion 96 of combustor liner surface 70. In one embodiment, portion 96 includes only outer liner first panel 64 and inner liner first panel 66 and any remaining panels 54 have a layer 90 of thermal barrier material with a thickness $T_2$ of 0.01 inches or less. In another embodiment, portion 96 includes outer and inner liner first panels 64 and 66, and at least one other outer liner panel 54 and inner liner panel 54, and any remaining panels 54 have thermal barrier material with thickness $T_2$ is 0.01 inches or less. In a further embodiment, combustor liner surface 70 thermal barrier material is applied such that layer 90 extends over all combustor panels 54 between combustor inlet 34 and combustor outlet turbine nozzle 38 and has thickness $T_1$ greater than 0.01 inches.

Thickness $T_1$ is measured from combustor liner surface 70 to a top surface 98 of layer 90. In one embodiment, layer 90 extends over portion 96 and has thickness $T_1$ approximately twice thickness $T_2$ of thermal barrier material extending over panels 54 not in portion 96. In another embodiment, thermal barrier material thickness $T_1$ is between 0.20 and 0.35 inches and thickness $T_2$ is 0.01 inches or less. In a further embodiment, thermal barrier material thickness $T_1$ is approximately 0.20 inches.

During operation, as atomized fuel is injecting into combustion zone 36 and ignited, heat is generated within zone 36. Air enters combustion zone 36 through cooling slots 78 and forms a thin protective boundary of air along combustor liner surface 70. Combustor inner and outer liners 52 and 50 shield gas turbine engine 10 from heat generated within combustion zone 36. Because portion 96 has thermal barrier material with a thickness $T_1$ less heat is absorbed into panels 54 within combustor portion 96 and an operating temperature of combustor 30 is lowered, thus reducing an amount of thermal strains within combustor assembly 16.

The above-described combustor assembly is cost-effective and highly reliable. The combustor assembly includes a thermal barrier material having a thickness greater than 0.01 inches covering at least a portion of the combustor liner. As a result, the combustor liner absorbs less heat, and therefore, the combustor may be operated at higher temperatures. Because the operating temperature is reduced, low cycle fatigue within the combustor is reduced, which in turn, extends an operating life cycle for the combustor assembly.

While the invention has been described in terms of various specific embodiments, those skilled in the art will recognize that the invention can be practiced with modification within the spirit and scope of the claims.

What is claimed is:

1. A liner comprising a series of panels arranged in steps relative to one another, said panels separated by a series of cooling slots formed by overhanging portions of said series of panels, each said panel comprising a liner surface and an exterior surface, said panels having a layer of thermal barrier material applied only against said panel liner surface such that at least one of said panels has a layer of thermal barrier material having a thickness of greater than 0.01 inches, and such that an upstream edge of the thermal barrier material applied to each panel is downstream an adjacent upstream panel overhanging portion.

2. A liner in accordance with claim 1 further comprising at least one panel having a layer of thermal barrier material having a thickness at least twice that of a layer of thermal barrier material of said remaining panels.

3. A liner in accordance with claim 1 wherein said series of panels comprises a first panel, and a second panel, said first panel connected serially to said first panel.

4. A liner in accordance with claim 3 wherein said first panel has a layer of thermal barrier material having a thickness greater than 0.01 inches.

5. A liner in accordance with claim 4 wherein said first panel has a layer of thermal barrier material having a thickness at least twice that of a layer of thermal barrier material covering said second panel.

6. A combustor comprising:

an inlet;

an outlet;

a radially inner liner extending between said inlet and said outlet, said inner liner comprising a series of panels arranged in steps relative to one another, each said panel comprising a liner and a exterior surface, said inner liner panels separated by a series of cooling slots formed by overhanging portions of said inner liner panels, said inner liner panels having a layer of thermal barrier material, and a radially outer liner extending between said inlet and said outlet, said inner liner and said outer liner connected to form a combustion zone, said outer liner comprising a series of panels arranged in steps relative to one another, each said panel comprising a liner and an exterior surface, said outer liner panels separated by a series of cooling slots formed by overhanging portions of said outer liner panels, said outer liner panels having a layer of thermal barrier material, at least one of said inner liner panels and said outer liner panels having a layer of thermal barrier material applied only against said panel liner surface and having a thickness greater than 0.01 inches, greater than 0.01 inches, such that an upstream edge of the thermal barrier material applied to each panel liner surface is downstream an adjacent upstream panel exterior surface.

7. A combustor in accordance with claim 6 wherein said inner liner series of panels comprise a first panel and a second panel, said inner liner second panel serially connected downstream from said inner liner first panel, said outer liner series of panels comprise a first panel and a second panel, said outer liner first panel adjacent said combustor inlet, said outer liner second panel connected serially downstream from said outer liner first panel.

8. A combustor in accordance with claim 7 wherein at least one of said inner liner first panel and said outer liner first panel has a layer of thermal barrier material having a thickness greater than 0.01 inches.

9. A combustor in accordance with claim 7 wherein at least one of said inner liner panels and said outer liner panels has a layer of thermal barrier material having a thickness of approximately 0.02 inches.

10. A combustor in accordance with claim 9 wherein at least one of said inner liner first panel and said outer liner first panel has a layer of thermal barrier material having a thickness of approximately 0.02 inches.

11. A combustor in accordance with claim 8 wherein said inner and said outer liner first panels have a layer of thermal barrier material having a thickness greater than 0.01 inches.

12. A combustor in accordance with claim 11 wherein said inner and said outer liner first panels have a layer of thermal barrier material having a thickness of approximately 0.02 inches.

* * * * *

UNITED STATES PATENT AND TRADEMARK OFFICE
CERTIFICATE OF CORRECTION

PATENT NO.     : 6,438,958 B1
DATED          : August 27, 2002
INVENTOR(S)    : McCaffrey et al.

Page 1 of 1

It is certified that error appears in the above-identified patent and that said Letters Patent is hereby corrected as shown below:

Column 4,
Line 30, delete "to said first" and insert therefor -- to said second --.
Line 44, delete "and a" and insert therefor -- and an --.

Signed and Sealed this

Twelfth Day of October, 2004

JON W. DUDAS
*Director of the United States Patent and Trademark Office*